United States Patent
Small (10) Patent No.: US 9,516,200 B2
(45) Date of Patent: Dec. 6, 2016

(54) INTEGRATED EXTENDED DEPTH OF FIELD (EDOF) AND LIGHT FIELD PHOTOGRAPHY

(71) Applicant: Samsung Electronics Co., Ltd., Gyeonggi-do (KR)

(72) Inventor: Eran Small, Tel-Aviv (IL)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/583,995

(22) Filed: Dec. 29, 2014

(65) Prior Publication Data

US 2016/0191897 A1    Jun. 30, 2016

(51) Int. Cl.
*H04N 5/225* (2006.01)
*G06T 5/50* (2006.01)
*H04N 5/232* (2006.01)

(52) U.S. Cl.
CPC ............ *H04N 5/225* (2013.01); *G06T 5/50* (2013.01); *H04N 5/23212* (2013.01); *G06T 2200/21* (2013.01); *G06T 2207/10052* (2013.01); *G06T 2207/10148* (2013.01)

(58) Field of Classification Search
USPC ........ 382/162, 167, 199; 348/187, 135, 266, 348/269, 272, 222.1, 223.1; 600/109, 129, 176, 600/111
See application file for complete search history.

(56) References Cited

U.S. PATENT DOCUMENTS

| | | | |
|---|---|---|---|
| 5,585,847 A * | 12/1996 | Sayag | H04N 3/1525 348/266 |
| 7,224,540 B2 | 5/2007 | Olmstead et al. | |
| 7,965,936 B2 | 6/2011 | Raskar et al. | |
| 8,131,097 B2 | 3/2012 | Lelescu et al. | |
| 8,339,462 B2 * | 12/2012 | Stec | H04N 17/002 348/187 |
| 8,379,321 B2 | 2/2013 | Szapiel et al. | |
| 8,488,044 B2 | 7/2013 | Mathieu | |
| 8,497,934 B2 | 7/2013 | Milnes et al. | |
| 8,593,564 B2 | 11/2013 | Border et al. | |

(Continued)

FOREIGN PATENT DOCUMENTS

| CN | 102306291 A1 | 1/2012 |
|---|---|---|
| EP | 2487645 A1 | 9/2011 |

OTHER PUBLICATIONS

Guichard et al, "Extended Depth-of-Field using Sharpness Transport adross Colour Channels", Optomechatronic Micro-Nano Devices and components 3, SPIE, vol. 7250, Jan. 2009, pp. 1-12, XP002676338.

(Continued)

*Primary Examiner* — Anh Do
(74) *Attorney, Agent, or Firm* — Jefferson IP Law, LLP (57) ABSTRACT

A method for light field acquisition, comprising: acquiring an image by an optical arrangement with chromatic aberrations; separating the image to a plurality of monochromatic images, each having a different color and a different point of focus according to the acquiring; transporting sharpness from each of the plurality of monochromatic images to others of the plurality of monochromatic images to construct a plurality of color images, each color image of the plurality of color images having a different point of focus; and reconstructing a light field by combining the plurality of color images.

21 Claims, 6 Drawing Sheets
(4 of 6 Drawing Sheet(s) Filed in Color)

(56) References Cited

U.S. PATENT DOCUMENTS

| | | | |
|---|---|---|---|
| 8,672,838 B2* | 3/2014 | McDowall | A61B 1/00009 600/129 |
| 8,684,914 B2* | 4/2014 | McDowall | A61B 1/00096 600/109 |
| 8,764,633 B2* | 7/2014 | McDowall | G02B 27/283 600/109 |
| 8,811,769 B1 | 8/2014 | Pitts et al. | |
| 9,129,295 B2* | 9/2015 | Border | G02B 5/23 |
| 9,254,076 B2* | 2/2016 | McDowall | G02B 27/283 |
| 9,254,078 B2* | 2/2016 | McDowall | A61B 1/00009 |
| 2011/0211824 A1 | 9/2011 | Georgiev et al. | |
| 2013/0147994 A1 | 6/2013 | Gao et al. | |
| 2013/0265485 A1 | 10/2013 | Kang | |

OTHER PUBLICATIONS

Oliver Cossairt et al, "Spectral Focal Sweep:Extended depth of field from chromatic aberrations", Computational Photographt(ICCP), 2010 IEEEInternational Conference, Mar. 29, 2010, p. 1-8, XP031763031.

Ihrke et al, "A theory of plenoptic multiplexing", 2010 IEEE conference on computer Vision and Pattern Recognition (CVRP), Jun. 13, 2010, pp. 483-490, XP0317258999.

Huixuan Tang et al, "Utilizing Optical Aberrations for extended-Depth-of-Field Panoramas", Nov. 5, 2012, Computer Vision ACCV 2012, Springer Berlin Heidelberg, p. 365-378, XP047027195.

* cited by examiner

INTEGRATED EXTENDED DEPTH OF FIELD (EDOF) AND LIGHT FIELD PHOTOGRAPHY

FIELD AND BACKGROUND OF THE INVENTION

The present invention, in some embodiments thereof, relates to light field acquisition and, more particularly, but not exclusively, to light field reconstruction using extended depth of field (EDOF).

Light field photography (plenoptic photography) is a relatively new technique in the field of computational imaging which is based on measurement of both the location and angle of the light rays. In comparison to normal photography which measures only the intensity of the light reaching the detector, light field photography measures both the intensity on the detector and the direction it arrives from.

Light field imaging has many benefits in comparison to normal imaging since it measures the entire optical function and allows manipulating it computationally. The post capture manipulation allows changing the focus or viewing angle of the image. Furthermore, depth map of the scene can be calculated out of the light field measurement to generate a color 3D model of the scene.

The main technique for light field acquisition is by using a lenslet array (an array of micro-lenses) which is placed in front of the image sensor. Each lens deflects different angles of light rays to different sensor's pixels. This allows measuring both the light ray's location (the specific lenslet it reaches) and its angle (the specific pixel illuminated).

Another way to acquire light fields is by using an attenuation mask and compressed sensing algorithms. The attenuation mask is placed in front of the sensor. By using knowledge on the light fields' sparsity under a certain representation and the attenuation mask one can use compressed sensing algorithms to reconstruct the light field with high resolution. This approach is perused mainly in academia and research centers.

Extended depth of field (EDOF) is a technique that utilizes chromatic aberrations of the optics to generate an image with an extended depth of field while still using a low f number. This technique was mainly used for mid-level cell phone such as Nokia phones. In optics, chromatic aberration is a type of distortion for which the lens has a different focal plane for each color. This is caused due to lens being made of a material having chromatic dispersion (different index of refraction for each color). In this effect each color is focused in a different plane causing a different point spread function (PSF) for each color. Standard optical systems use different type of glasses to minimize this effect. In comparison to standard optics, EDOF technology utilizes the chromatic aberration. Since each color have a different focal length, the optical arrangement will be focused on different planes for different colors. Standard EDOF algorithms use the data from each color channel to generate one all in focus image. This achieves an optical arrangement with an extended depth of field.

SUMMARY OF THE INVENTION

According to an aspect of some embodiments of the present invention there is provided a method for light field acquisition, comprising: acquiring an image by an optical arrangement with chromatic aberrations; separating the image to a plurality of monochromatic images, each having a different color and a different point of focus according to the acquiring; transporting sharpness from each of the plurality of monochromatic images to others of the plurality of monochromatic images to construct a plurality of color images, each color image of the plurality of color images having a different point of focus; and reconstructing a light field by combining the plurality of color images.

Optionally, the combining includes inversing the focusing operator of stack of the plurality of color images.

Optionally, the reconstructing comprises: performing a two-dimensional Fourier transform on each of the plurality of color images to create a plurality of transformed color images; calculating an inverted light field by pseudo-inversing each frequency for each of the plurality of color transformed images; and performing a two-dimensional inverse Fourier transform on the inverted light field to create a true light field.

Optionally, the optical arrangement is a camera that includes a lens having different focal plane for each color.

Optionally, the method further comprises, after the reconstructing: performing a re-focusing algorithm on the reconstructed light field.

Optionally, the method further comprises, after the reconstructing: producing an all in focus image from the reconstructed light field.

Optionally, the method further comprises, after the reconstructing:
  constructing a three-dimensional model of the imaged scene according to the reconstructed light field.

Optionally, the plurality of monochromatic images is of colors red, green and blue.

Optionally, the plurality of monochromatic images is of colors cyan, magenta and yellow.

According to some embodiments of the present invention there is provided a computer readable medium comprising computer executable instructions adapted to perform the method.

According to an aspect of some embodiments of the present invention there is provided a method for light field reconstruction, comprising: acquiring a plurality of color images, each having a different point of focus; performing a two-dimensional Fourier transform on each of the plurality of color images to create a plurality of transformed color images; calculating an inverted light field by pseudo-inversing each frequency for each of the plurality of transformed color images; and performing a two-dimensional inverse Fourier transform on the inverted light field to create a true light field.

Optionally, the method further comprises, before the performing of the two-dimensional Fourier transform: re-scaling each of the plurality of color images.

Optionally, the method further comprises, before the performing of the two-dimensional Fourier transform: separating each of the plurality of color images to a plurality of parts.

Optionally, at least one of the performing a two-dimensional Fourier transform, the calculating an inverted light field and the performing a two-dimensional inverse Fourier transform is done simultaneously using parallel computing.

Optionally, the pseudo-inversing is done by a Moore-Penrose algorithm.

According to an aspect of some embodiments of the present invention there is provided a system for light field acquisition, comprising: an optical arrangement with chromatic aberrations that acquires an image; a separation module that separates the image to a plurality of monochromatic images, each having a different color and a different point of focus according to the acquiring; and constructs a plurality of color images, each color image of the plurality of color images having a different point of focus, by transporting sharpness from of the plurality of monochromatic images to others of the plurality of monochromatic images; and integration module that reconstructs light field by combining the plurality of color images.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to light field acquisition and, more particularly, but not exclusively, to light field reconstruction using extended depth of field (EDOF).

Each of the known solution has different advantages and limitations. Lenslet array technique has high optical efficiency (refractive optics), but requires relatively low need of computational resources for light field manipulation, high optical complexity in fabrication of the lenslet array and low resolution that is determined by the lenslet resolution. Compressed sensing technique has high resolution, but medium optical complexity in fabrication of the attenuation mask, medium optical efficiency with 50% transmittance due to the attenuation mask and very high need of computational resources due to complex reconstruction algorithms.

According to some embodiments of the present invention, there is provided a method for light field acquisition that is based on integration of two technologies: EDOF and light field imaging. EDOF technology the method allows high resolution with good optical efficiency, simple optics and moderated computational power required. This makes the technology of light field acquisition more accessible to medium and low end applications and enables simpler optics (no lenslet arrays required).

When applied, the method includes acquiring an image from an optical arrangement with chromatic aberrations so each color has different point of focus, separating the image to multiple monochromatic images with different colors and different points of focus according to the acquiring, sharpness is transported from each monochromatic image to the other monochromatic images to construct multiple color images with different points of focus and reconstructing the light field from the color images.

According to some embodiments of the present invention, there is provided a method for reconstruction of the light field from the color images. The method includes acquiring color images with different points of focus, performing two-dimensional Fourier transform on each of the color images, calculating light field by pseudo-inversing each frequency for each of the color images and performing two-dimensional inverse Fourier transform on the calculated light field.

In normal photography each pixel measures the sum of light absorbed by the photo-sensitive media regardless to the direction the light arrives from, therefore the measurement is a two-dimensional data array. Light field photography, that is referred to in the present invention, is a measurement of both the location and the angle of the light rays reaching the detector. In this case the output information is four-dimensional (two-dimensional position and two two-dimensional angles).

Conventional light field cameras are relatively big and expensive. This technique allows high resolution light field with cheap and compact optics (see Nokia's implementations of EDOF in cellphones). Furthermore, the technique allows light field reconstruction with very high resolution which is higher than any other available acquisition technique (actual sensor's resolution in comparison to Lytro's lenslet resolution). This opens the way of make light field photography accessible to many new devices and platforms.

Figure 1:
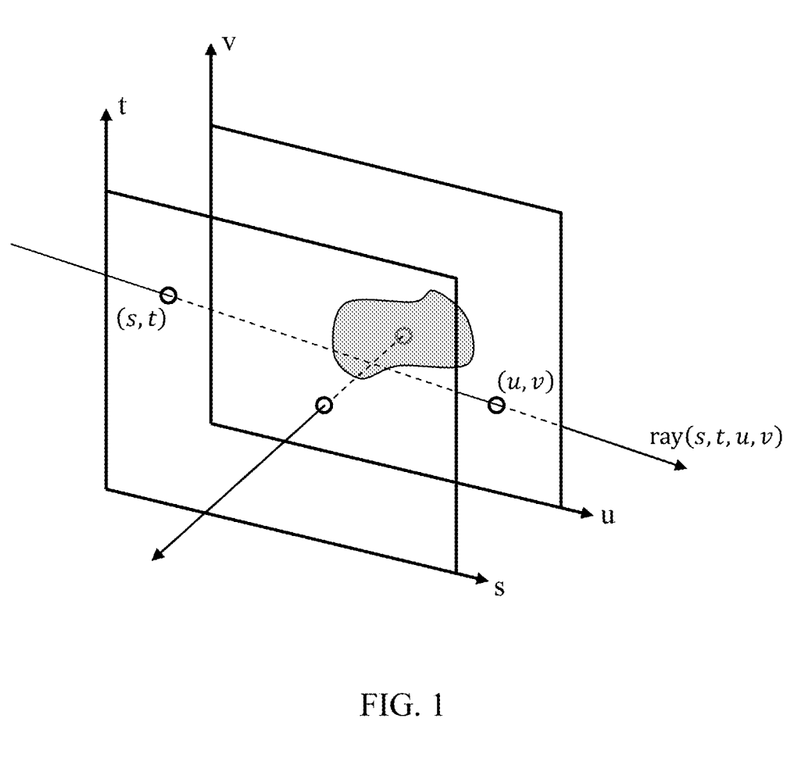
FIG. 1 is a schematic illustration of two planes parameterization for explaining light field definitions.

For purposes of better understanding some embodiments of the present invention, reference is first made to a two planes parameterization as illustrated in FIG. 1 for explaining light field definitions. The two planes parameterization is a convenient parameterization for light fields inside an optical arrangement. Here each ray is indicated by its intersection with two different planes (the detector plane and the lens plane). According to this notation the light field is defined as the four-dimensional data structure: L(s,t,u, v). Projection of the four-dimensional light field into two-dimensional images with different point of focus is done according to the following formula:

$$I_\alpha(s, t) = \int\int L\left(\frac{s}{\alpha} + u\left(1 - \frac{1}{\alpha}\right), \frac{t}{\alpha} + v\left(1 - \frac{1}{\alpha}\right), u, v\right) du dv$$

where α is the re-focusing parameter (amount of change of the focusing plane). Changing the viewing angle is simply done by choosing a specific viewing point of the light field: $I_{(u_i,v_i)}(s,t)=L(s,t,u_i,v_i)$ where $u_i$ and $v_i$ are the desired viewing point on the lens plane.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
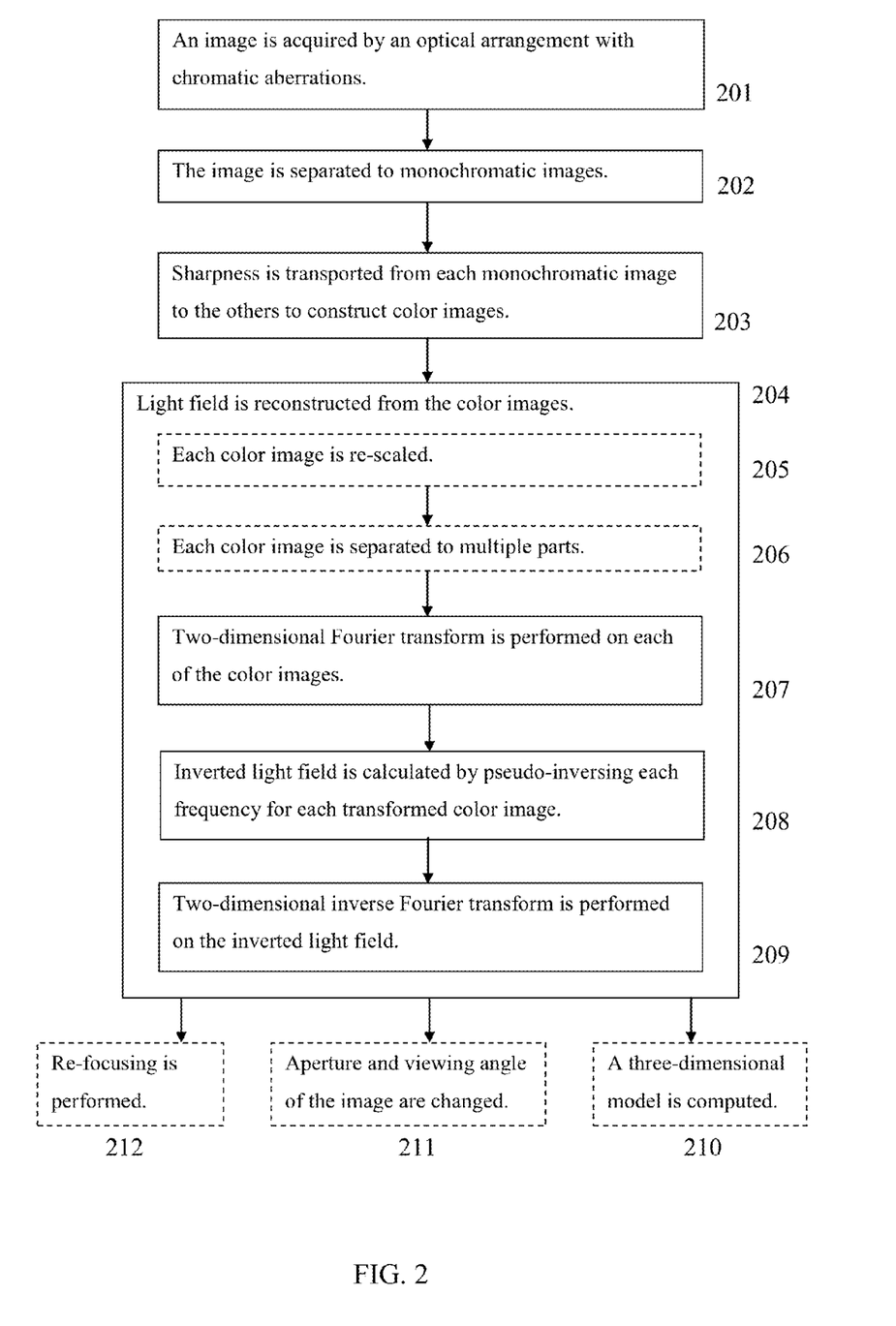
FIG. 2 is a flowchart schematically representing a method for light field acquisition using EDOF, according to some embodiments of the present invention.
Figure 3:
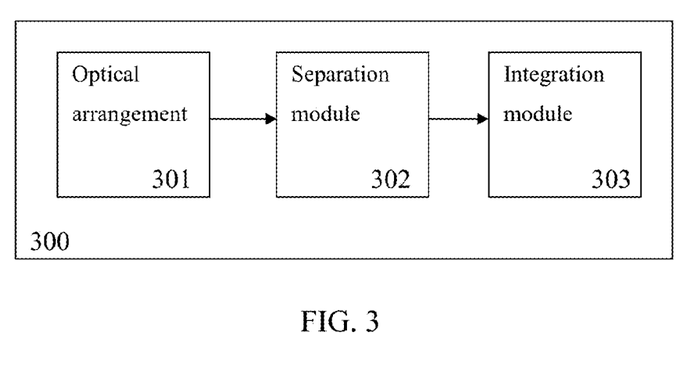
FIG. 3 is a schematic illustration of a system for light field acquisition, according to some embodiments of the present invention.

Referring now to the drawings, FIG. 2 is a flowchart schematically representing a method for light field acquisition using EDOF, according to some embodiments of the present invention. Reference is also made to FIG. 3, which is a schematic illustration of a system 300 for light field acquisition, according to some embodiments of the present invention.

First, as shown at 201, an image is acquired by an optical arrangement with chromatic aberrations 301. Optical arrangement 301 may be, for example, a camera with a lens having different focal plane for each color and/or any other arrangement. The lens may be made from specific glasses or diffractive optics to generate the required chromatic dispersion. The acquired image is an EDOF image having a different point of focus for each color map acquired from the sensor of the optical arrangement. The image may include any number of colors, according to the sensor used for capturing the image. For example, the image may include three colors—red, green and blue, or cyan, magenta and yellow or any other combination of colors.

Then, as shown at 202, the EDOF image is separated to multiple monochromatic images, each having a different color and a different point of focus, according to the different point of focus of each color in the EDOF image. The number of monochromatic images produced is equal to the number of colors in the EDOF image.

This is done by a separation module 302 that may be any kind of software and/or hardware, and/or may be implemented on any kind of computing device, for example, a mainframe computer, multiple connected computers, a personal computer and/or a mobile device such as a tablet computer, a laptop computer, a mobile phone, electronic glasses and/or any other device.

The captured image may be transferred to separation module 302, for example, by a local area network (LAN), wireless local area network (WLAN) such as Wireless Fidelity (WiFi™), cellular network, Bluetooth, universal serial bus (USB) and/or any other kind of communication.

Then, as shown at 203, sharpness is transported from each of the monochromatic images to the other monochromatic images, to construct multiple color images, each having a different point of focus. This is done by separation module 302

The by transporting sharpness, a color image is generated for each focus by transporting details between different monochromatic images. Each color image of a specific focus initially has one color channel with correct focus from one monochromatic image and other channel with wrong focus from the other monochromatic images. The construction of the color image is achieved by transporting the sharpness from the right focus color channel to the rest of the color channels.

A sharpness transport algorithm is used for merging two input images (one for the correct focus and the other for the correct color) to one output image that should be the correct color focused on the correct plane.

Figure 4A:
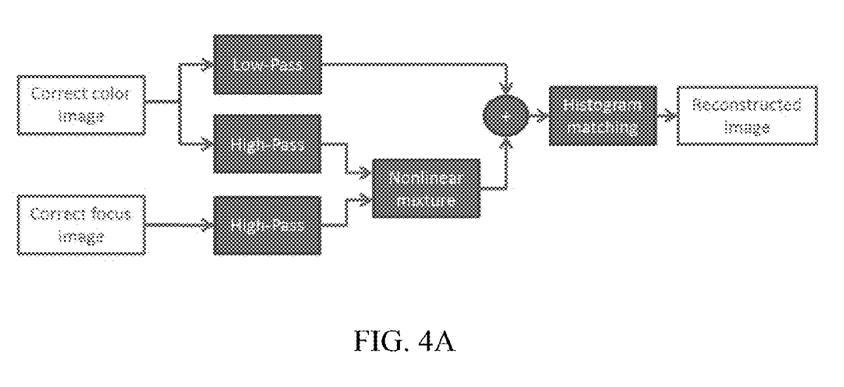
FIG. 4A is a flowchart schematically representing an exemplary sharpness transport algorithm, according to some embodiments of the present invention.

Reference is now made to FIG. 4A, which is a flowchart schematically representing an exemplary sharpness transport algorithm, according to some embodiments of the present invention. The algorithm takes the low frequencies from the correct color image and adjusts the high frequencies according to a nonlinear mixture of both images. A histogram matching may be applied after the mixture to adjust the final shades.

Figure 4B:
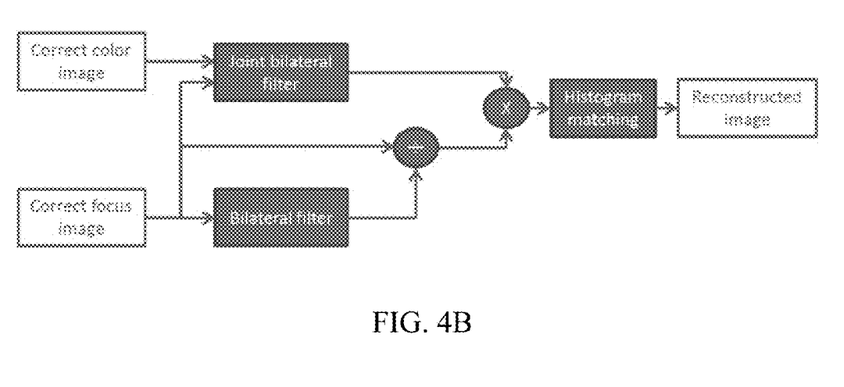
FIG. 4B is a flowchart schematically representing a second exemplary sharpness transport algorithm, according to some embodiments of the present invention.

Reference is also made to FIG. 4B, which is a flowchart schematically representing a second exemplary sharpness transport algorithm, according to some embodiments of the present invention. In this algorithm a joint bilateral filter is used to blur the correct color image in the appropriate place. The details of the correct focus image are extracted by dividing it by its on bilateral filter. The output image is achieved by multiplying the blurred correct color image by the details extraction of the correct focus image. Finally, histogram matching may be applied to adjust the final shades.

Finally, as shown at 204, light field is reconstructed from the color images by integration module 303. Integration module 303 may be any kind of software and/or hardware as described above.

The light field reconstruction may be done by any method, such as inversing algorithms and/or compressed sensing algorithms.

Optionally, the light field reconstruction is done by pseudo-inversing the re-focusing operator as shown at 205-209.

First, optionally, as shown at 205, each color image is re-scaled. This helps in dividing the operator to multiple smaller operators, enables paralleling of the calculation and reduces memory usage. This is done by defining a shift invariant operator:

$$\tilde{L}_\alpha(k_s,k_t)=\iint L(k_s,k_t,u,v)e^{iu(\alpha-1)k_s}e^{iv(\alpha-1)k_t}dudv$$

Then, optionally, as shown at 206, each color image is separated to multiple parts. This is done due to memory considerations, as smaller parts of an image are easier to process, and some part may be processed simultaneously, for example using parallel computing.

Then, as shown at 207, a two-dimensional Fourier transform is performed on each of the color images or, if separated, on each of the parts to create multiple transformed color images or transformed parts. Applying two-dimensional Fourier transform in the (s,t) plane on both sides of the equation above:

$$\tilde{I}_\alpha(k_s,k_t) = \iint L(k_s,k_t,u,v) e^{iu(\alpha-1)k_s} e^{iv(\alpha-1)k_t} du dv$$

A two-dimensional Fourier transform in the (u,v) plane is obtained:

$$\tilde{I}_\alpha(k_s,k_t) = L(k_s,k_t,(1-\alpha)k_s,(1-\alpha)k_t)$$

Then, as shown at 208, an inverted light field is calculated by pseudo-inversing each frequency for each transformed color image or, if separated, on each of the transformed parts. This equation above is separable for each frequency component in the ($k_s$, $k_t$) domain, therefore the inversion may be done independently for each frequency. The inversion problem may be defined as follows: find L ($k_s$, $k_t$, $k_u$, $k_v$) that satisfies the following set of equations:

$$\begin{cases} L(k_s, k_t, (1-\alpha_1)k_s, (1-\alpha_1)k_t) = \tilde{I}_1(k_s, k_t) \\ \vdots \\ L(k_s, k_t, (1-\alpha_n)k_s, (1-\alpha_n)k_t) = \tilde{I}_n(k_s, k_t) \end{cases}$$

This inversion is done by applying Moore-Penrose pseudo-inverse algorithm on the re-sampling operator described in the equation above.

Finally, as shown at 209, a two-dimensional inverse Fourier transform is performed on the inverted light field to create a true light field.

Optionally, the color images with different points of focus are acquired by any method, and the light field reconstruction is done by pseudo-inversing the re-focusing operator as shown above. For example, the color images may be acquired by taking consecutive photos with different points of focus of the same scene using a standard camera.

Optionally, the acquired light field is then used to carry out different processes that utilize the additional optical information captured. This information allows computational manipulations that cannot be achieved with conventional photography. The computational manipulations allow simulation of different optical parameters without taking another image and three-dimensional data extraction.

As shown at 210, re-focusing may be performed. The full information of the light rays allows computationally propagating the imaging section back and forth simulating different point of focus. This allows a user to take an image regardless of the focus (faster and cheaper acquisition) and choose the imaging plane post capture. Also an all in focus image may be produced.

As shown at 211, the aperture and viewing angle of the image may be changed post capture. By changing of the integration span of the focusing operator one can reduce the aperture of the image. This is equivalent to taking a series of images in several apertures. The imaging viewing angle can also be tilted by taking a non-symmetric integration span. This allows generation of different perspective of an object out of a single image.

As shown at 212, a three-dimensional model of the imaged scene may be computed. This may be done by one of several known algorithms such as depth from correspondence algorithms and depth from defocus algorithms. The accuracy of the depth estimation can be remarkably improved by merging several different algorithms.

In addition to the "standard" light field applications mentioned above this compact and cheap architecture for light field acquisition can be used for medical applications (such as endoscopy) and improve computer vision performance (three-dimensional information can improve depth perception for object identification gesture recognition etc.). Another major advantage of light field is for video capture where the focus can be change post capture without the artifacts of the autofocus iterations.

Figure 5A:
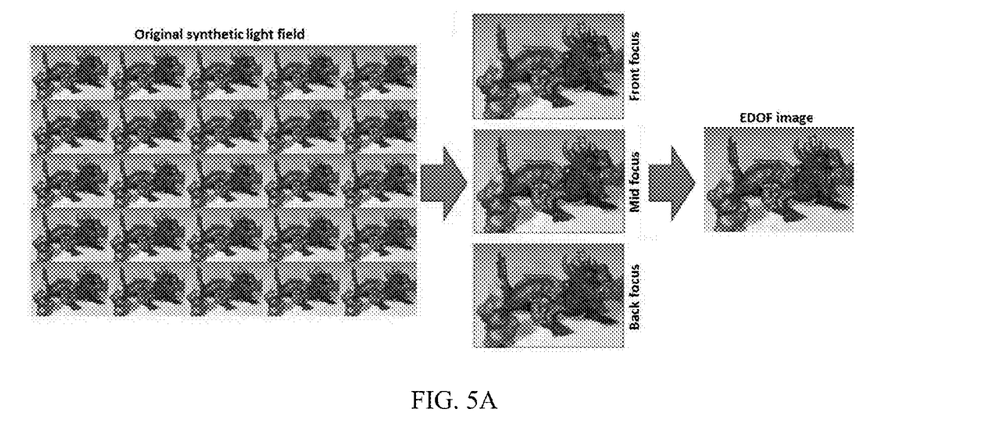
FIGS. 5A, 5B, 5C and 5D which are an exemplary process of light field acquisition demonstrated on a synthetic light field image, according to some embodiments of the present invention.

Reference is now made to FIGS. 5A, 5B, 5C and 5D which are an exemplary process of light field acquisition demonstrated on a synthetic light field image, according to some embodiments of the present invention. This synthetic light field image originated from a synthetic light field archive of Massachusetts Institute of Technology's media lab. An EDOF image was computationally generated from the synthetic light field image (for example by a re-focusing algorithm) so it may be reconstructed using a method according to some embodiments of the present invention. FIG. 5A shows the original light field and the three focuses calculated out of it. Each of the three pictures is focused on a different plane of the scene. Only one color channel is then taken from each image (simulating different point of focus for different colors) and they are combined to one EDOF image.

Figure 5B:
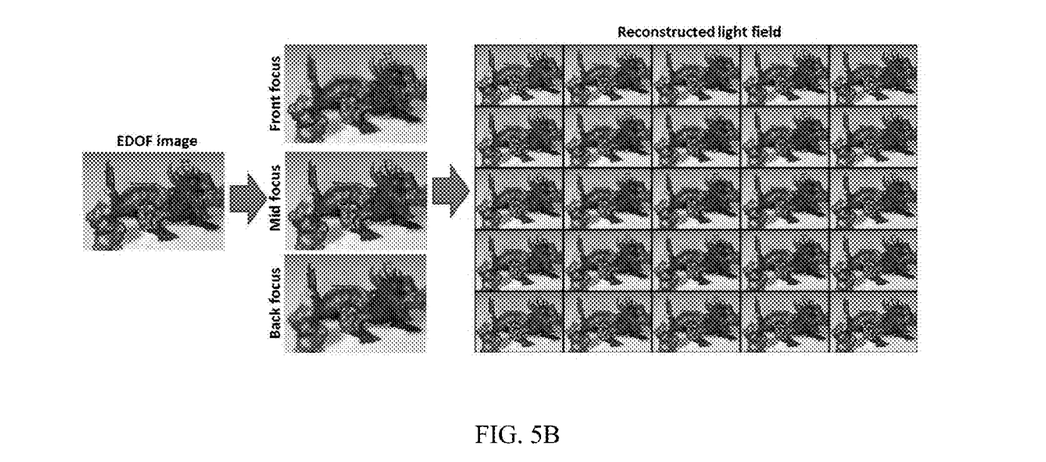
Figure 5C:
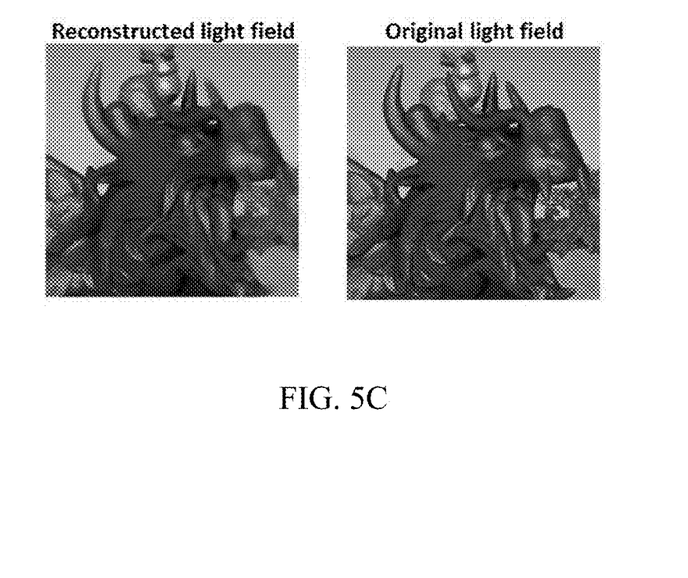

The calculated EDOF image is now used as input for the reconstruction process as shown in FIG. 5B. The first step for reconstruction is applying the sharpness transform as can be shown by the reconstructed three focuses. The second step is reconstructing the light field out of the focuses. A comparison of the reconstructed and original light field is shown in FIG. 5C by zooming in on the face of the dragon.

Figure 5D:
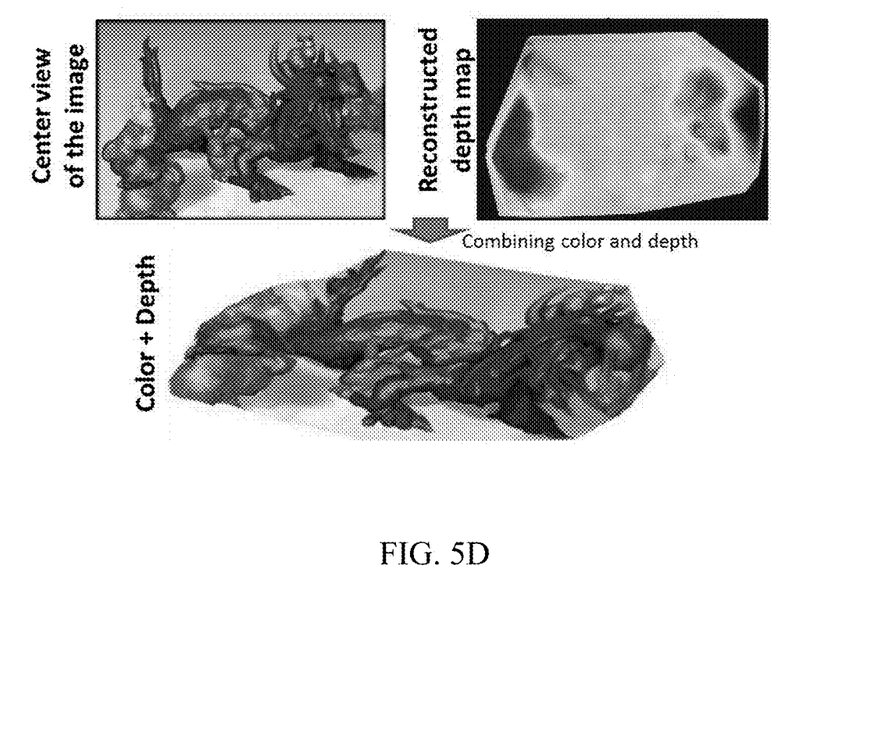

FIG. 5D shows the depth map estimation of the reconstructed light field. Upper left subplot of FIG. 5D is the all in focus center field of view render of the reconstructed light field. The upper right subplot is the depth map estimation where it is clearly visible that the head of the dragon and the three bunnies are closest while the body is further and the bush is furthest. The lower subplot is the three-dimensional color combination of the depth map and color image. This shows that using a single EDOF image it is possible to reconstruct a three-dimensional colored model of the scene.

Figure 6A:
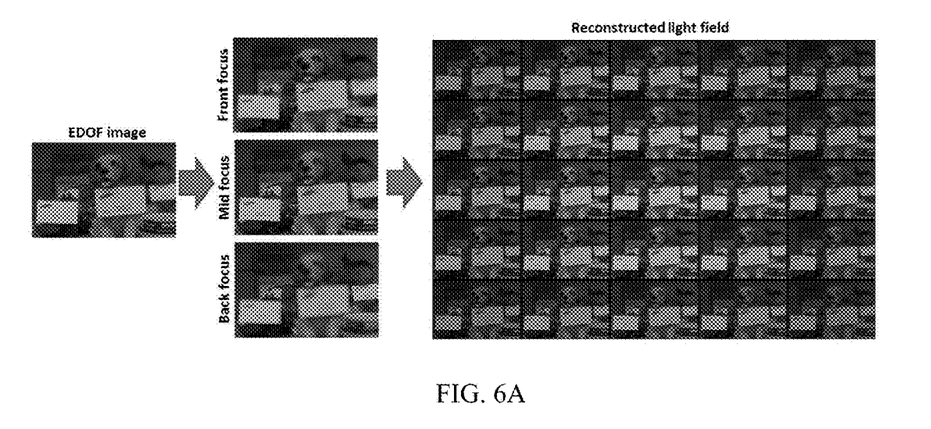
FIGS. 6A and 6B which are an exemplary process of light field acquisition demonstrated on a captured image, according to some embodiments of the present invention.
Figure 6B:
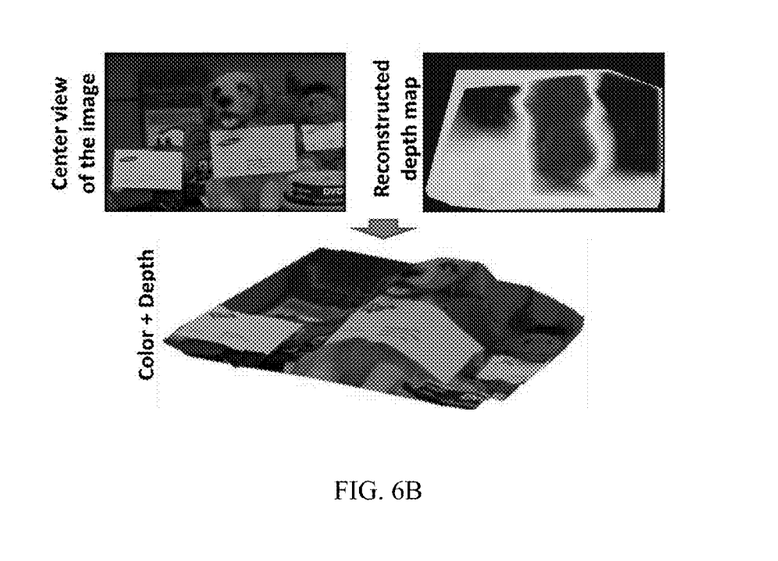

Reference is now made to FIGS. 6A and 6B which are an exemplary process of light field acquisition demonstrated on a captured image, according to some embodiments of the present invention.

A digital single-lens reflex (DSLR) camera is used to capture a real scene in three focuses. The EDOF effect is simulated in the same way as with the synthetic case by taking only one color channel from each image. FIG. 6A shows the same algorithmic steps for light field reconstruction applied to the EDOF image generated from the real images. This may be done in higher resolution than can be achieved with any other light field acquisition technique. The three-dimensional structure of the scene is then estimated with the same algorithms applied on the synthetic light field. FIG. 6B shows the all in focus center view, depth map estimation and color three-dimensional model of the scene.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems for light field acquisition will be developed and the scope of the term light field acquisition is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for light field acquisition by a device including a processor, comprising:
    acquiring, by the processor, an image from an optical arrangement with chromatic aberrations;
    separating by the processor, said image into a plurality of monochromatic images, each having a different color and a different point of focus according to said acquiring;
    transporting, by the processor, sharpness from each of said plurality of monochromatic images to others of said plurality of monochromatic images to construct a plurality of color images, each color image of said plurality of color images having a different point of focus; and
    reconstructing, by the processor, a light field by combining said plurality of color images.

2. The method of claim 1, wherein said combining includes inversing, by the processor, the focusing operator of stack of said plurality of color images.

3. The method of claim 1, wherein said reconstructing comprises:
    performing, by the processor, a two-dimensional Fourier transform on each of said plurality of color images to create a plurality of transformed color images;
    calculating, by the processor, an inverted light field by pseudo-inversing each frequency for each of said plurality of color transformed images; and
    performing, by the processor, a two-dimensional inverse Fourier transform on said inverted light field to create a true light field.

4. The method of claim 1, further comprising, after said reconstructing:
    performing, by the processor, a re-focusing algorithm on said reconstructed light field.

5. The method of claim 1, further comprising, after said reconstructing:
    producing, by the processor, an all in focus image from said reconstructed light field.

6. The method of claim 1, further comprising, after said reconstructing:
    constructing, by the processor, a three-dimensional model of a scene of the image according to said reconstructed light field.

7. The method of claim 1, wherein said plurality of monochromatic images is of colors red, green and blue.

8. The method of claim 1, wherein said plurality of monochromatic images is of colors cyan, magenta and yellow.

9. A tangible computer readable storage medium comprising computer executable instructions adapted to perform the method of claim 1.

10. A method for light field reconstruction acquisition by a device including a processor, comprising:
acquiring, by the processor, a plurality of color images, each having a different point of focus;
performing, by the processor, a two-dimensional Fourier transform on each of said plurality of color images to create a plurality of transformed color images;
calculating, by the processor, an inverted light field by pseudo-inversing each frequency for each of said plurality of transformed color images; and
performing, by the processor, a two-dimensional inverse Fourier transform on said inverted light field to create a true light field.

11. The method of claim 10, further comprising, before said performing of said two-dimensional Fourier transform:
re-scaling, by the processor, each of said plurality of color images.

12. The method of claim 10, further comprising, before said performing of said two-dimensional Fourier transform:
separating, by the processor, each of said plurality of color images to a plurality of parts.

13. The method of claim 10, wherein at least one of said performing a two-dimensional Fourier transform, said calculating an inverted light field and said performing, by the processor, a two-dimensional inverse Fourier transform is done simultaneously using parallel computing.

14. The method of claim 10, wherein the calculating of the inverted light field comprises, pseudo-inversing, by the processor, each frequency by a Moore-Penrose algorithm.

15. An apparatus for light field acquisition, comprising:
an optical arrangement with chromatic aberrations, configured to acquire an image;
a storage configured to store instructions therein;
a processor that, when executing the instructions, is configured to:
separate said image to a plurality of monochromatic images, each having a different color and a different point of focus according to said acquiring,
construct a plurality of color images, each color image of said plurality of color images having a different point of focus, by transporting sharpness from of said plurality of monochromatic images to others of said plurality of monochromatic images, and
reconstruct the light field by combining said plurality of color images.

16. The apparatus of claim 15, wherein said processor is further configured to inverse the focusing operator of stack of said plurality of color images.

17. The apparatus of claim 15, wherein said processor is further configured to:
perform a two-dimensional Fourier transform on each of said plurality of color images to create a plurality of transformed color images,
calculate an inverted light field by pseudo-inversing each frequency for each of said plurality of color transformed images, and
perform a two-dimensional inverse Fourier transform on said inverted light field to create a true light field.

18. The apparatus of claim 15, wherein said optical arrangement is a camera that includes a lens having different focal plane for each color.

19. The apparatus of claim 15, wherein said processor is further configured to perform a re-focusing algorithm on said reconstructed light field.

20. The apparatus of claim 15, wherein said processor is further configured to produce an all in focus image from said reconstructed light field.

21. The apparatus of claim 15, wherein said processor is further configured to construct a three-dimensional model of a scene of the image according to said reconstructed light field.

* * * * *